United States Patent

Terazono et al.

(10) Patent No.: US 7,883,637 B2
(45) Date of Patent: Feb. 8, 2011

(54) COMPOSITE SINTERED BODY OF DIELECTRIC SUBSTANCE AND MAGNETIC SUBSTANCE, AND LC COMPOSITE ELECTRONIC COMPONENT

(75) Inventors: Hirofumi Terazono, Kirishima (JP); Takeshi Matsui, Kirishima (JP)

(73) Assignee: Kyocera Corporation, Kyoto (JP)

( * ) Notice: Subject to any disclaimer, the term of this patent is extended or adjusted under 35 U.S.C. 154(b) by 565 days.

(21) Appl. No.: 11/963,586

(22) Filed: Dec. 21, 2007

(65) Prior Publication Data

US 2008/0149882 A1    Jun. 26, 2008

(30) Foreign Application Priority Data

Dec. 25, 2006   (JP)  ............................ 2006-348422
Feb. 26, 2007   (JP)  ............................ 2007-045602
Sep. 27, 2007   (JP)  ............................ 2007-251566

(51) Int. Cl.
*H01F 1/34*      (2006.01)
*C04B 35/495*    (2006.01)

(52) U.S. Cl. ............. 252/62.63; 252/62.59; 252/62.61; 501/135; 501/126

(58) Field of Classification Search ................ 501/135, 501/126; 252/62.63, 62.59, 62.61
See application file for complete search history.

(56) References Cited

U.S. PATENT DOCUMENTS 5,029,043 A    7/1991   Kitahara et al.
6,814,883 B2   11/2004   Marusawa

FOREIGN PATENT DOCUMENTS

| JP | 02249294 A | 10/1990 |
|----|------------|---------|
| JP | 2002-289413 | * 10/2002 |
| JP | 2003146739 A | 5/2003 |
| JP | 2003226573 A | 8/2003 |

* cited by examiner

*Primary Examiner*—C. Melissa Koslow
(74) *Attorney, Agent, or Firm*—DLA Piper LLP (US)

(57) ABSTRACT

A composite sintered body of dielectric substance and magnetic substance comprises a hexagonal Ba ferrite crystal, a perovskite type crystal containing at least one element selected from Ca, Sr, and Ba, and Ti, and Li element, and the relative magnetic permeability is 1.4 or more at 1 GHz. LC composite electronic component comprises the composite sintered body, a condenser circuit formed in the inside or the surface of the composite sintered body, and an inductor circuit formed in the inside or the surface of the composite sintered body.

8 Claims, 1 Drawing Sheet

COMPOSITE SINTERED BODY OF DIELECTRIC SUBSTANCE AND MAGNETIC SUBSTANCE, AND LC COMPOSITE ELECTRONIC COMPONENT

BACKGROUND OF THE INVENTION

1. Field of the Invention

The present invention relates to a composite sintered body and a LC composite electronic component, and more particularly to a composite sintered body of dielectric substance and magnetic substance having both dielectric properties and magnetic properties which is used in an EMI (Electro Magnetic Interference) filter for high frequency noise reduction of electronic apparatuses, and a LC composite electronic component.

2. Description of the Related Art

Until now, an EMI filter has been widely used for high frequency noise reduction of electronic apparatuses. However, in recent years, properties of an EMI filter capable of being used at a high frequency band in a range from several hundred MHz to several GHz are in demand, to comply with high frequency mobile communication apparatuses such as mobile phones, wireless LANs and the like.

Generally, it has been required that the EMI filter which is used for noise reduction of electronic apparatuses is miniaturized, to comply with the miniaturization of electronic apparatuses.

For this reason, a noise filter has been proposed, in which a coil is formed by silver electrode and the like, in the inside of a composite ceramic where the mixture of magnetic substance and dielectric substance has been fired.

As a magnetic material used for such a composite ceramic, a spinel type ferrite such as Mn—Zn based, Ni—Zn based, Ni—Cu—Zn based and the like, which has a high magnetic permeability in a frequency region between several MHz and several hundred MHz, has been widely used.

In recent years, a hexagonal ferrite material of which the magnetic permeability extends to a frequency region higher than the frequency limit of the spinel type ferrite, has been proposed as a magnetic material in a frequency region between several hundred MHz and several GHz.

The hexagonal ferrite is easily magnetized in a direction of a axis, which hereinafter is called an easy magnetization axis, in a plane perpendicular to the c axis which is so called easy magnetizasion axis, and it is a magnetic material called as a ferrox-planar type ferrite. As a typical ferrox-planar type ferrite of a magnetic material, $3BaO.2CoO.12Fe_2O_3$ which is Co substituted Z type hexagonal ferrite, $2BaO.2CoO.6Fe_2O_3$ which is Co substituted Y type hexagonal ferrite, $BaO.2CoO.8Fe_2O_3$ which is Co substituted W type hexagonal ferrite and the like, are known.

Meanwhile, as a dielectric material used for the composite ceramic, paraelectrics such as $CaTiO_3$, $SrTiO_3$, glass and the like, and ferroelectrics such as $BaTiO_3$ and the like, can be exemplified.

If a composite ceramic material having a high magnetic permeability and a high dielectric constant is realized, the miniaturization of electronic apparatuses can be attained. Therefore, a composite ceramic material having both properties is required.

SUMMARY

According to an aspect of the present invention, a composite sintered body of dielectric substance and magnetic substance contains a hexagonal Ba ferrite crystal, a perovskite type crystal containing at least one element selected from Ca, Sr, and Ba, and T and Li element. Relative magnetic permeability of the composite sintered body is 1.4 or more at 1 GHz.

According to an other aspect of the present invention, a LC composite electronic component includes the above mentioned composite sintered body, a condenser circuit and an inductor circuit. The condenser circuit is formed in the inside or the surface of the composite sintered body. The inductor circuit is formed in the inside or the surface of the composite sintered body.

DETAILED DESCRIPTION OF THE PREFERRED EMBODIMENT

Figure 1:
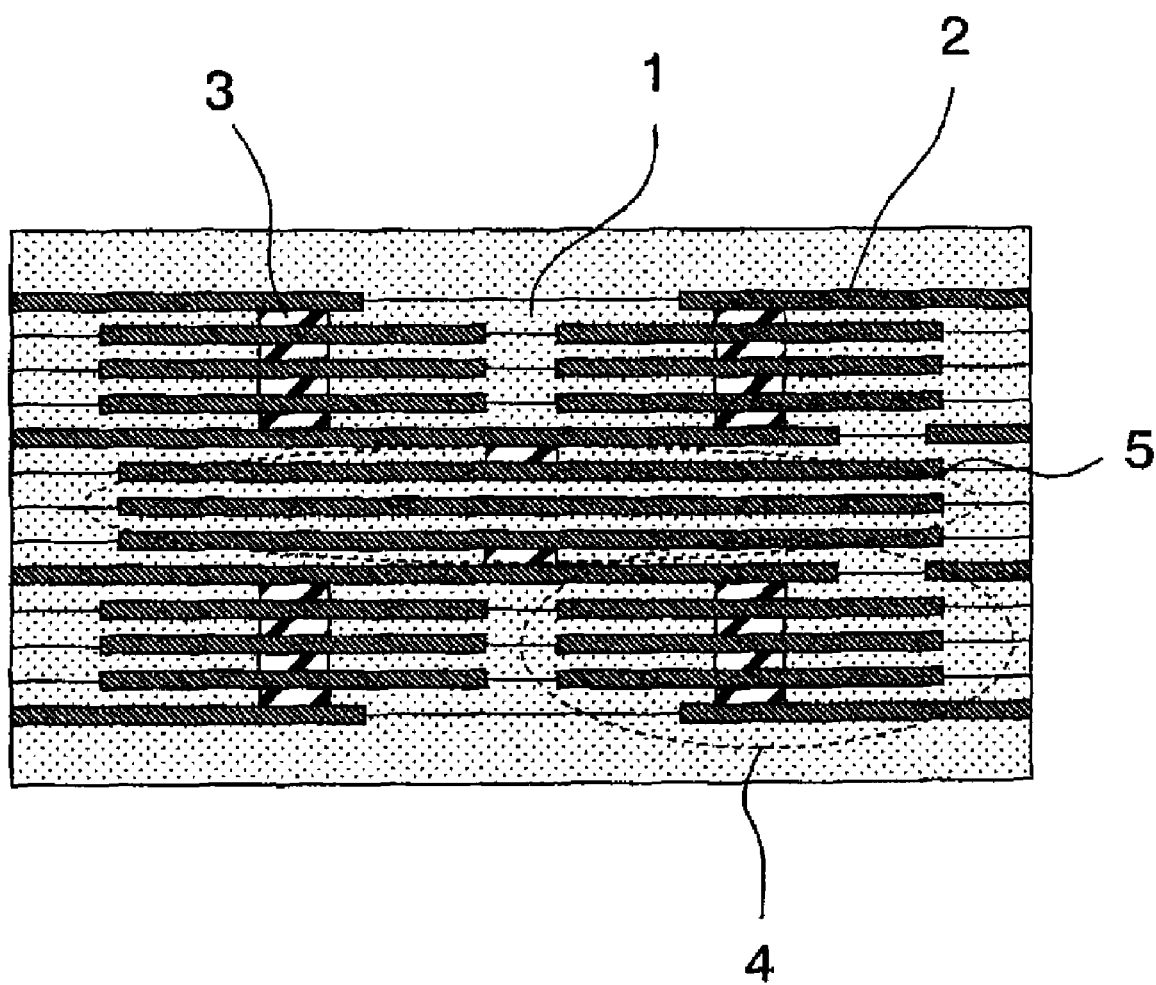
FIG. 1 is a sectional view for showing a LC composite electronic component according to an embodiment of the present invention.

A composite sintered body of dielectric substance and magnetic substance according to an embodiment of the present invention comprises a hexagonal Ba ferrite crystal, a perovskite type crystal containing at least one element selected from Ca, Sr and Ba and Ti as a dielectic substance, and Li.

By including Li in a sintered body in which a hexagonal Ba ferrite crystal as a magnetic material is mixed with a perovskite type crystal as a dielectric material, the deterioration of magnetic permeability and dielectric constant of the materials used as raw materials can be improved, resulting in the composite sintered body of dielectric substance and magnetic substance having a relative magnetic permeability of 1.4 or more at 1 GHz.

That is to say, the hexagonal ferrite means crystals having an easy magnetization axis as well as a hexagonal crystal structure. Specifically, the hexagonal ferrite has a high rotational magnetization resonant frequency due to having a different anisotropic magnetic field depending on the crystal direction, the a axis in a crystal plane (c plane) perpendicular to the c axis is easily magnetized in the direction of magnetic field, and the orientation of magnetization is changed, easily following the change of direction of external magnetic field. Therefore, the hexagonal ferrite may keep the relative magnetic permeability high in a high frequency region such as several hundred MHz to several GHz. In contrast, the relative magnetic permeability of spinel ferrite, which does not have the easy magnetization axis, has several hundred at several hundred MHz but low at 1 GHz or lower. Also, the hexagonal Ba ferrite containing Ba makes it possible to reduce a calcination temperature to form from raw materials such as iron oxide and barium carbonate.

Further, Li reduces, a reaction between the magnetic material and the dielectric material used as a raw material during firing and prevents a significant deterioration of properties by a change in at least one of the magnetic material and the dielectric material. Accordingly, maintained are both of the relative magnetic permeability and the relative dielectric constant. Therefore, Li element in a sintered body of hexagonal Ba ferrite crystal as a magnetic substance combined with perovskite crystal as a dielectric substance improves a relative magnetic permeability to 1.4 or higher at 1 GHz.

Such a composite sintered body of dielectric substance and magnetic substance can be produced, for example, by mixing a magnetic material and a dielectric material with glass, which have been synthesized in advance, and sintering.

To produce the hexagonal Ba ferrite powders, 50~90 mol % of $Fe_2O_3$, 0~40 mol % of MO (provided that M is at least one metal element selected from Co, Cu and Zn), 10~50 mol % of BaO, in terms of each oxide, are mixed as a main component of the raw material. The raw materials are not limited to those mentioned above but metal salts such as carbonates or nitrates which forms oxides during sintering. M may be single element or a mixture of at least two elements. When a mixture of at least two kinds are used as M, it is preferable to let the total content of the mixture fall into the range of 0~40 mol %.

For example, a hexagonal Y type Ba ferrite crystal which has a high magnetic permeability especially at 1 GHz among hexagonal Ba ferrite crystals, is represented by the chemical formula, $Ba_2M_2Fe_{12}O_{22}$ (provided that M is at least one metal element selected from Co, Cu and Zn), and can be compounded by mixing raw materials of each of the components to be the above-mentioned composition. Even if a crystal is different from $Ba_2M_2Fe_{12}O_{22}$ in the composition, when it is near to $Ba_2M_2Fe_{12}O_{22}$ crystal which can be found in JCPDS (Joint Committee on Powder Diffraction Standards) card or database of crystals, the crystal is regarded as $Ba_2M_2Fe_{12}O_{22}$ crystal.

The mixed powders compounded as above are calcined at a temperature range of 900~1300° C. for 1~10 hours in atmosphere, followed by being milled, to obtain the hexagonal Ba ferrite powders.

For example, in the case of Y type (hexagonal Y type Ba ferrite crystal) among hexagonal Ba ferrite crystals, the decomposition of a $BaFe_{12}O_{19}$ crystal and a $BaFe_2O_4$ crystal starts at nearly 850° C., to form the hexagonal Y type Ba ferrite crystal. In order to perform the decomposition and the generation sufficiently, it is preferable to calcine at a temperature range of 900~1100° C. for 1~5 hours. By this means, 80% or more of raw material turns into the hexagonal Y type Ba ferrite crystal during calcination. The calcination temperature of 1100° C. or lower, slows sintering of powders which are simultaneously formed from the above-mentioned reaction, to make the milling of powders easier.

A milling of the magnetic material can be performed with the wet method in use of vibrating mill, turning mill, barrel mill and the like, by using media such as steel ball, ceramic ball and the like and organic solvent such as water, isopropylalcohol (IPA), methanol and the like.

An average particle size of powders for synthesizing the hexagonal Ba ferrite crystal, is preferably 0.1~5 μm, more preferably 0.1~1 μm, to improve sinterability. The "average particle size" means a particle size d50 at a point where a cumulative curve becomes 50%, when the cumulative curve is made by putting a total volume of powder group as 100%. A particle size distribution of powders can be determined, for example, by using microtrack particle size distribution measuring apparatus X-100 (produced by Nikkiso Co., Ltd.) according to laser diffraction scattering method.

The hexagonal Ba ferrite crystal obtained in this manner is sintered without sintering aid to have a high magnetic permeability even in a high frequency band, of which the relative magnetic permeability is 3~17 in the region of several MHz ~ several hundred MHz, and 1.4~10 in the region of several hundred MHz~2 GHz.

A plurality of types of hexagonal Ba ferrite crystals are known and Y type of hexagonal Ba crystal is preferred among those crystals, it is formed with a Y type hexagonal ferrite crystal preferably in the ratio of 80 vol % or more of all magnetic substances, more preferably 90 vol % or more. The volume ratio can be calculated by Rietveld method according to the result of X-ray diffraction. When the ratio of the Y type hexagonal ferrite crystal is 80 vol % or more, a higher magnetic permeability at a high frequency can be obtained and a high frequency circuit component having a high inductance or impedance can be obtained.

As a dielectric material, a material comprising a perovskite type crystal containing at least one element selected from Ca, Sr and Ba and Ti, is used.

Such a dielectric material having a perovskite type crystal structure includes, for example, barium titanate, strontium titanate, calcium titanate or solid solution thereof and solid solution of each where magnesium titanate is solid solved in addition. However, it is preferable to use $BaTiO_3$ which is a ferroelectric, in order to obtain a high dielectric constant by a small adding amount, and to prevent the deposition of heterogeneous phase of $Ba_{1.55}Ca_{0.45}SiO_4$ crystal or $Ba_{0.88}Ca_{0.12}TiO_3$ crystal and the like due to the reaction with Ba in the hexagonal Ba ferrite during mixing and sintering with the hexagonal Ba ferrite powders, thereby producing a composite sintered body of dielectric substance and magnetic substance having a high dielectric constant.

On this occasion, the average particle size of $BaTiO_3$ powders is preferably 0.1~1.5 μm, more preferably 0.3~1.0 μm, in order to increase the magnetic permeability and the dielectric constant of the composite sintered body of dielectric substance and magnetic substance.

When the particle size is too small and it is arranged dispersively between particles of the hexagonal Ba ferrite, the sintering of the hexagonal Ba ferrite is inhibited, so that a desired magnetic permeability cannot be obtained. Because too much amount of the dielectric substance cannot be added in order to obtain a high magnetic permeability and too much amount of a sintering aid such as glass and/or oxides with low softening point, for example Bismuth oxides, cannot be added in order to improve sinterability, a grain growth during sintering cannot be expected much. For this reason, it is preferable to select $BaTiO_3$ powders having a large particle size to an extent when mixed with materials, to attain a high dielectric constant and a high magnetic permeability. Preferably, the average particle size of $BaTiO_3$ powders is 0.3~1.0 μm.

$BaTiO_3$ powders with the average particle size as described above have a relative dielectric constant of 2000~3000, making it possible to obtain a composite sintered body of dielectric substance and magnetic substance having a high dielectric constant.

Meanwhile, in a composite sintered body of dielectric substance and magnetic substance, $CaTiO_3$ or $SrTiO_3$ is preferably used in order to obtain a dielectric loss of 0.1 or lower while increasing a dielectric constant at 1 GHz. $CaTiO_3$ or $SrTiO_3$ has a lower relative dielectric constant than $BaTiO_3$, however, they enable a dielectric loss to be low, it is preferable to use them in the case that a low dielectric loss is required especially.

Glass may be preferably mixed with a magnetic substance and dielectric substance to improve the sinterability. Glass containing at least Si, Ca Ba and Li, and substantially free from Al and B is preferably used.

The preferable composition of glass is, for example, 20~70 mol % of Si in terms of $SiO_2$, 3~26 mol % of Ca in terms of CaO, 16~60 mol % of Ba in terms of BaO, and 3~11 mol % of Li in terms of $Li_2O$.

When glass is softened at the temperature near the decomposition temperature of binders, typically seen in temperature range between 150 and 400° C., the decomposed element of binders is possibly introduced into the glass to cause color change of sintered body, forming of glass, or deterioration of sinterability. However, the content of Si in terms of $SiO_2$ falls within the above-mentioned range, the binder-removing property during sintering is improved and also the sinterability at a temperature of 1000° C. or lower can be improved.

When the content of Ba in terms of BaO falls within the above-mentioned range, the binder-removing property during sintering is improved and an low open porosity can be easily obtained.

Ca and Li contained in glass enable the softening behavior of glass to be controlled, and the condition of sintering process can be set to a preferable range. Therefore, when the contents of Ca in terms of CaO and Li in terms of $LiO_2$ fall within the above-mentioned range, the binder-removing property during sintering is improved and an low open porosity can be easily obtained, as Ba described above.

More preferable glass composition is 35~65 mol % of Si in terms of $SiO_2$, 5~20 mol % of Ca in terms of CaO, 20~50 mol % of Ba in terms of BaO, and 3~7 mol % of Li in terms of $Li_2O$.

Further, the reason why glass free from Al and B is preferred is that the components result in forming a heterogeneous phase crystal. Examples of such a heterogeneous phase crystals include $BaAl_2Si_2O_8$, $BaB_2O_4$, $ZnAl_2O_4$, $CaAl_2Si_2O_8$.

It is preferable that the heterogeneous phase crystal is not formed, to obtain a sufficient magnetic permeability and a dielectric constant easily. In other words, it is preferable that the composite sintered body has substantially free from such heterogeneous phase crystals.

Further, glass substantially free from Al and B refers to glass where the raw material of Al or B has not been added voluntarily in the course of the production of glass, and a small amount of Al and B as impurities in the glass may be contained because those impurities in raw materials are unavoidable and can not be eliminated. The content of each as impurities in the glass is preferably 0.1 mol % or lower.

"The composite sintered body has substantially free from $BaAl_2Si_2O_8$, $BaB_2O_4$, $ZnAl_2O_4$ or $CaAl_2Si_2O_8$" referres that these crystals are not found by X-ray diffraction analysis. In particular, the peak height ratio of the heterogeneous phase crystal to the peak height of a crystal which is recognized as the highest peak is not more than 0.01.

Meanwhile, Li is preferably contained in glass as a raw material from the viewpoint that Li makes the reaction slow between the magnetic material and the dielectric material as well as controlling the softening point of the glass. However, Li may be added with the form of $Li_2CO_3$ or $LiHCO_3$ from the viewpoint of the reaction prevention. The amount of Li is preferably 0.1~1.5 mol part by mass in terms of the oxide ($Li_2O$), more preferably 0.2~1 mol part for slowing reaction and having reliability and durability of insulation when the total amount of magnetic substance and dielectric substance is 100 parts by mass. By adding them, it is possible to reduce a sintering temperature without the reaction of the magnetic material and the dielectric material, and a composite sintered body can be obtained in which the properties of each material are not deteriorated much. When $Li_2CO_3$ or $LiHCO_3$ is added, the composite sintered body may contain Li-containing complex oxide crystals such as $LiCuFe_2O_4$.

A mixing ratio to obtain a composite sintered body of dielectric substance and magnetic substance can be adjusted depending on a desired magnetic permeability and dielectric constant. The preferable mixing ratio is within the range that 55~95 vol % of the magnetic material comprising hexagonal Ba ferrite crystal, and 5~45 vol % of the dielectric material comprising perovskite type crystal. The composite sintered body should contain 1.5~25 part by mass of glass and 0~5 part by mass of Li crystal (Li is in a glass if the contento of Li crystal is zero) as a sintering aids when the total contents of the magnetic substance and the dielectric substance is 100 parts by mass.

When the contents of the magnetic material and the dielectric material fall within the above-mentioned range, a composite sintered body having a higher relative magnetic permeability and a higher relative dielectric constant can be obtained. When the content of glass falls within the above-mentioned range, an improved sinterability a high relative dielectric constant can be obtained.

Bismuth oxide ($Bi_2O_3$), a oxide with low softening point, may be added to improve the sinterability further. The amount of Bismuth oxide is 0.5~15 parts by mass compared to the total amount of hexagonal Ba ferrite and dielectric substance is 100 parts. This composition makes it easy to obtain a composite sintered body having more than 90% of theoretical density when sintered at 1000° C. or lower. The composition also makes the magnetic permeability higher. When Bi is added as a form of $Bi_2O_3$, it remains or it is changed to a complex oxide crystal including Bi such as $Bi_{12}TiO_{20}$ in the composite sintered body.

When the magnetic material and the dielectric material are mixed and fired to form a composite, it was necessary to add a sintering aid to make the sintering temperature low. For example, because the perovskite type crystal as the dielectric material can be sintered only at a temperature as high as 1200~1300° C., while the hexagonal Y type Ba ferrite as the magnetic material is sintered at 900~1000° C., it is necessary to add a sintering aid to obtain a composite sintered body having a high strength and a high density at a low sintering temperature.

On this occasion, a sintering aid is required, which is difficult to react with the magnetic material and the dielectric material, that is, which hardly affects the magnetic permeability and the dielectric constant and reduces only a sintering temperature.

On the other hand, because the magnetic permeability and the dielectric constant of a composite ceramic increase or decrease exponentially depending on a volume ratio of each of the added magnetic material and the dielectric material, a sintering aid need to be added as little as possible, to enhance the magnetic permeability and the dielectric constant.

Moreover, additives having less reactivity with magnetic substance and dielectric substance may make it possible to sinter the composite at a low temperature with respect to small effects on magnetic permeability and dielectric constant.

Taking composition into account with respect to above points, a composite sintered body of dielectric substance and magnetic substance according to the embodiment of the present invention can have high magnetic permeability of 1.4 or more even at a high frequency band about 1 GHz.

Further, the ratio of materials, that is, 55~95 vol % of the magnetic material comprising Y-type hexagonal Ba ferrite crystal, and 5~45 vol % of the dielectric material comprising perovskite type crystal, remains approximately same after sintering. The ratio after sintering can be determined by Rietveld method according to X-ray diffraction analysis. Specifically, the mass ratio of each phase (hexagonal Ba ferrite crystal, perovskite type crystal, and glass) is determined by Rietveld method. Next, the density of hexagonal Ba ferrite crystal is obtained from the crystal structure, and by converting the mass ratio into the volume ratio, the volume ratio is determined.

The composition of glass remains approximately same as it was after sintering.

According to the present embodiment, a condenser circuit and an inductor circuit are formed in the composite sintered body and a LC composite electronic component can be produced.

An EMI filter component which is preferred embodiment of a LC composite electronic component will be explained with reference to FIG. 1. A plurality of insulating layers 1 are laminated and wiring layers 2 are formed on the surfaces of the insulating layers 1. And via hole conductors 3 are formed passing through the insulating layers 1, which electrically connect between the wiring layers 2 which are separated from each other by the insulating layers 1.

An inductor portion 4 and a condenser portion 5 are formed in the inside of the insulating layers 1 by the wiring layers 2 and the via hole conductors 3, to comprise a filter circuit.

The inductor portion 4 is formed in a shape of coil by the wiring layers 2 and the via hole conductors 3, however, the number of wound coil needs to be increased in order to increase an inductance of a circuit, generally. But in the case that a magnetic material having a high magnetic permeability as the composite magnetic material of the present embodiment is used, a required inductance can be obtained even if the number of wound coil is not increased. By this means, the number of lamination of the wiring layers 2 can be reduced, to obtain an electronic component capable of reducing the size and the height.

As for a LC composite electronic component, by using the composite sintered body of dielectric substance and magnetic substance according to the embodiment of the present invention as the insulating layers, the LC composite electronic component of the present embodiment can be obtained.

It is preferable that a low resistance metal forming the wiring layers 2 and the via hole conductors 3 is a metal which contains any one of gold, silver and copper. When the wiring layers 2 contain the low resistance metal as a main component, the wiring layers 2 can attain a low resistance and decrease a signal delay of a high frequency signal.

To produce the LC composite electronic component of the present embodiment, a suitable organic binder, a dispersant and a solvent are added to the above-mentioned raw materials and mixed to produce slurry. And the slurry is molded into the shape of sheet by doctor blade method, calendar roll method, rolling method or press molding method which is well-known method.

And a through hole is formed onto the molded body having sheet shape, if required, and a conductor paste containing the low resistance metal is filled into the through hole.

Then, an wiring pattern is printed on the surface of the molded body having sheet shape, by using metal paste according to known methods such as screen printing method, gravure printing method and the like, to set the thickness of the wiring layer to be 5~30 μm, or metal foil is attached and processed to be a pattern shape, or metal foil processed as a pattern shape is attached.

Next, a plurality of molded bodies having sheet shape are aligned, laminated, compressed, and cut to comply with the size of electronic component. The cut pieces are heated to 200~500° C. in oxidative atmosphere or low oxidative atmosphere to remove the binder, and then heated to 900~1100° C. in oxidative atmosphere or non-oxidative atmosphere to sinter. Thus, the LC composite electronic component of the present embodiment can be obtained.

As for the sintering atmosphere, it is selected depending on the kind of low resistance metal which is used. For example, when a metal such as copper which is oxidized by sintering in oxidative atmosphere is used, it is necessary to perform the sintering in non-oxidative atmosphere, while the sintering can be performed in oxidative atmosphere in the case of gold and silver.

By performing the above-mentioned process, a LC filter having excellent properties to reduce noise even at a high frequency band in a range of several hundred MHz several GHz as well as having a high magnetic permeability and a high dielectric constant can be obtained with high reproducibility.

EXAMPLES

First, as raw materials, $Fe_2O_3$, CoO, CuO, ZnO and $BaCO_3$ were mixed with the molar ratio of 60:0.5:5:14:20.5 with regard to samples No. 1~No. 40 in Table 1, by using IAP as an organic solvent and steel ball as a medium by the wet method. The mixed materials were dried, and calcined at 950° C. in atmosphere, followed by milling in solvent for 72 hours to obtain a magnetic material. This material contains hexagonal Y type $Ba_2Zn_2Fe_{12}O_{22}$ crystal as a main crystal therein, which has an average diameter of 1 micrometer. The dielectric constant and the magnetic permeability of the obtained magnetic material is 25 and 15 respectively. Although the composition of the material is represented by $Ba_{2.05}Zn_{1.4}Cu_{0.5}Co_{0.05}Fe_{12}O_{22}$, the main crystal phase is regarded as $Ba_2Zn_2Fe_{12}O_{22}$ crystal, because a X-ray diffraction peak of $Ba_{2.05}Zn_{1.4}Cu_{0.5}Co_{0.05}Fe_{12}O_{22}$ is exceedingly near to $Ba_2M_2Fe_{12}O_{22}$ crystal recorded in JCPDS card or database of crystal which is identified from.

The molar ratio of raw materials was set to be 60:10:0:10:20 for sample No. 41 of Table 1, 60:10:0:0:20 for sample No. 42, 60:10:10:0:20 for sample No. 43, 60:0:20:0:20 for sample No. 44, 60:0:10:10:20 for sample No. 45, followed by mixing and calcining in the same way, to obtain a magnetic material containing a hexagonal Y type Ba ferrite crystal having the average particle size of 1 μm.

Further, the molar ratio of raw materials was set to be 85.7:0:0:0:14.3 for sample No. 46 of Table 1 to obtain a magnetic material containing hexagonal M type ferrite crystal, 70.6:0:5.9:5.9:17.6 for sample No. 47 to obtain a magnetic material containing hexagonal Z type ferrite crystal, 72.7:18.2:0:0:9.1 for sample No. 48 to obtain a magnetic material containing hexagonal Z type ferrite crystal. The composites were fabricated as the same way except the calcinating temperature set at 1200° C.

Next, as a dielectric material, ferroelectric $BaTiO_3$ powder which is a perovskite type crystal, available at a market (average particle size: 0.3 μm, relative dielectric constant: 3000, relative magnetic permeability: 1.0) was prepared. And paraelectrics $CaTiO_3$ (average particle size: 0.3 μm, relative dielectric constant: 175, relative magnetic permeability: 1.0) and $SrTiO_3$ (average particle size: 0.3 μm, relative dielectric constant: 255, relative magnetic permeability: 1.0) were prepared.

As for glass, material powders of $SiO_2$, CaO, BaO, $Li_2O$, $Al_2O_3$, $B_2O_3$ and MgO were mixed to be the composition shown in Table 1, dissolved at 1200° C. and cooled quickly, to obtain glass. The obtained glass was milled for 48 hours by the wet method, to obtain glass material having an average particle size of 1.0 μm.

$Li_2CO_3$ powders having an average particle size of 3.0 μm were used for sample No. 32~35, 39 and 40, $Bi_2O_3$ powders having an average particle size of 3.0 μm were used for sample No. 36~40 and 46~48. These materials were added to magnetic substance and dielectric substance with a certain part by mass when the total amount of magnetic substance and dielectric substance is set to 100 part by mass.

Next, the magnetic material, the dielectric material, glass, $Li_2CO_3$ and $Bi_2O_3$ prepared as above, were mixed according to the mixing ratio shown in Table 1, by using IPA as an organic solvent and steel ball as a medium, dried, press molded to enable to evaluate the properties such as the relative magnetic permeability, the relative dielectric constant, the dielectric loss, the relative density and the like and the sintering property, and fired for 2 hours at 950~1100° C. in atmosphere, to obtain a composite sintered body of dielectric substance and magnetic substance. The obtained composite sintered body of dielectric substance and magnetic substance was subjected to evaluation of properties such as the relative magnetic permeability, the relative dielectric constant, the dielectric loss, the relative density and the like and the sintering property. The evaluation of the relative magnetic permeability, the relative dielectric constant and the dielectric loss was performed by measuring the value at 1 GHz.

The relative density was calculated by dividing a true density into a bulk density measured according to JIS R2205. The true density refers to a density of composite sintered body from which pores are excluded. Therefore, the composite sintered body was pulverized to have an average particle size of about 3 μm by using a mortar and the true density was measured by pyonometer method.

The sintered bodies were evaluated by Rietveld method according to the result of X-ray diffraction to calculate the amounts of magnetic substance, dielectric substance, other crystals and glass. The magnetic substance refers ferrite and dielectric substance refers to perovskite crystal including at lease one element of Ca, Sr and Ba, and Ti. Finally, the ratio of magnetic substance and dielectric substance are calculated based on above data.

The relative magnetic permeability can be measured by S parameter method using a coaxial tube, and the relative dielectric constant can be measured by parallel plate method using an impedance analyzer (HP429IA, produced by Hewlett Packard).

Further, the relative magnetic permeability and the relative dielectric constant of a composite sintered body obtained in the case that the reaction between dielectric substance, magnetic substance and glass was not occurred at all and an ideal sintering has been performed, were calculated according to logarithm mixing rule by using a relative magnetic permeability and a relative dielectric constant of each of dielectric substance, magnetic substance and glass which were used as raw materials, and a value obtained by dividing the calculated value into the actually measured value, was described in Table 1. When the value becomes 100, it means an ideal sintering has been performed, and when the value becomes below 100, it means certain reaction has been occurred to deteriorate the relative magnetic permeability or the relative dielectric constant. Also, there is a case that the value becomes above 100 because of the improvement of the relative magnetic permeability or the relative dielectric constant due to the effects of remained glass or fine crystal, or certain reaction.

As for a comparative example, a composite sintered body using a Ni—Cu—Zn based ferrite as a magnetic material which is a spinel type composite ferrite was produced (sample No. 49 in Table 1). In the same way as above described ferrite, NiO, ZnO, CuO and $Fe_2O_3$ were mixed as raw materials with the molar ratio of 15:25:12:48 by the wet method and calcined at 950° C., to obtain the magnetic material $Ni_{0.15}Zn_{0.25}Cu_{0.12}Fe_{0.96}O_{1.96}$ (average particle size: 1 μm, relative dielectric constant: 5, relative magnetic permeability: 1.2).

TABLE 1

| | Magnetic Substance | | | | Dielectric Substance | | |
|---|---|---|---|---|---|---|---|
| sample No. | Kind of Main Crystal in Hexagonal Ba Ferrite | Type of Main Crystal | Ratio in Composite Sintered Body (vol %) | Ratio in Main Composition of Composite Sintered Body (vol %) | Kind | Ratio in Composite Sintered Body (vol %) | Ratio in Main Composition of Composite Sintered Body (vol %) |
| 1 | $Ba_2Zn_2Fe_{12}O_{22}$ | Y | 70 | 78 | $BaTiO_3$ | 20 | 22 |
| 2 | $Ba_2Zn_2Fe_{12}O_{22}$ | Y | 70 | 78 | $BaTiO_3$ | 20 | 22 |
| 3 | $Ba_2Zn_2Fe_{12}O_{22}$ | Y | 50 | 56 | $BaTiO_3$ | 40 | 44 |
| 4 | $Ba_2Zn_2Fe_{12}O_{22}$ | Y | 40 | 44 | $BaTiO_3$ | 50 | 56 |
| 5 | $Ba_2Zn_2Fe_{12}O_{22}$ | Y | 60 | 67 | $BaTiO_3$ | 30 | 33 |
| 6 | $Ba_2Zn_2Fe_{12}O_{22}$ | Y | 70 | 78 | $BaTiO_3$ | 20 | 22 |
| 7 | $Ba_2Zn_2Fe_{12}O_{22}$ | Y | 80 | 89 | $BaTiO_3$ | 10 | 11 |
| 8 | $Ba_2Zn_2Fe_{12}O_{22}$ | Y | 90 | 94.7 | $BaTiO_3$ | 5.0 | 5.3 |
| 9 | $Ba_2Zn_2Fe_{12}O_{22}$ | Y | 95 | 97.4 | $BaTiO_3$ | 2.5 | 2.6 |
| 10 | $Ba_2Zn_2Fe_{12}O_{22}$ | Y | 90 | 97.3 | $BaTiO_3$ | 2.5 | 2.7 |
| 11 | $Ba_2Zn_2Fe_{12}O_{22}$ | Y | 50 | 83 | $BaTiO_3$ | 10 | 17 |
| 12 | $Ba_2Zn_2Fe_{12}O_{22}$ | Y | 60 | 86 | $BaTiO_3$ | 10 | 14 |
| 13 | $Ba_2Zn_2Fe_{12}O_{22}$ | Y | 65 | 81 | $BaTiO_3$ | 15 | 19 |
| 14 | $Ba_2Zn_2Fe_{12}O_{22}$ | Y | 90 | 92.3 | $BaTiO_3$ | 7.5 | 7.7 |
| 15 | $Ba_2Zn_2Fe_{12}O_{22}$ | Y | 70 | 78 | $BaTiO_3$ | 20 | 22 |
| 16 | $Ba_2Zn_2Fe_{12}O_{22}$ | Y | 70 | 78 | $BaTiO_3$ | 20 | 22 |
| 17 | $Ba_2Zn_2Fe_{12}O_{22}$ | Y | 70 | 78 | $BaTiO_3$ | 20 | 22 |
| 18 | $Ba_2Zn_2Fe_{12}O_{22}$ | Y | 70 | 78 | $BaTiO_3$ | 20 | 22 |
| 19 | $Ba_2Zn_2Fe_{12}O_{22}$ | Y | 70 | 78 | $BaTiO_3$ | 20 | 22 |
| 20 | $Ba_2Zn_2Fe_{12}O_{22}$ | Y | 70 | 78 | $BaTiO_3$ | 20 | 22 |
| 21 | $Ba_2Zn_2Fe_{12}O_{22}$ | Y | 70 | 78 | $BaTiO_3$ | 20 | 22 |
| 22 | $Ba_2Zn_2Fe_{12}O_{22}$ | Y | 70 | 78 | $BaTiO_3$ | 20 | 22 |
| 23 | $Ba_2Zn_2Fe_{12}O_{22}$ | Y | 70 | 78 | $BaTiO_3$ | 20 | 22 |
| 24 | $Ba_2Zn_2Fe_{12}O_{22}$ | Y | 70 | 78 | $BaTiO_3$ | 20 | 22 |
| 25 | $Ba_2Zn_2Fe_{12}O_{22}$ | Y | 70 | 78 | $BaTiO_3$ | 20 | 22 |
| 26 | $Ba_2Zn_2Fe_{12}O_{22}$ | Y | 70 | 78 | $BaTiO_3$ | 20 | 22 |

TABLE 1-continued

| | | | | | | | |
|---|---|---|---|---|---|---|---|
| 27 | $Ba_2Zn_2Fe_{12}O_{22}$ | Y | 70 | 78 | $CaTiO_3$ | 20 | 22 |
| 28 | $Ba_2Zn_2Fe_{12}O_{22}$ | Y | 75 | 83 | $SrTiO_3$ | 15 | 17 |
| 29 | $Ba_2Zn_2Fe_{12}O_{22}$ | Y | 70 | 78 | $SrTiO_3$ | 20 | 22 |
| 30 | $Ba_2Zn_2Fe_{12}O_{22}$ | Y | 60 | 67 | $SrTiO_3$ | 30 | 33 |
| *31 | $Ba_2Zn_2Fe_{12}O_{22}$ | Y | 70 | 78 | $BaTiO_3$ | 20 | 22 |
| 32 | $Ba_2Zn_2Fe_{12}O_{22}$ | Y | 70 | 78 | $BaTiO_3$ | 20 | 22 |
| 33 | $Ba_2Zn_2Fe_{12}O_{22}$ | Y | 70 | 78 | $BaTiO_3$ | 20 | 22 |
| 34 | $Ba_2Zn_2Fe_{12}O_{22}$ | Y | 70 | 78 | $CaTiO_3$ | 20 | 22 |
| 35 | $Ba_2Zn_2Fe_{12}O_{22}$ | Y | 70 | 78 | $SrTiO_3$ | 20 | 22 |
| 36 | $Ba_2Zn_2Fe_{12}O_{22}$ | Y | 70 | 78 | $BaTiO_3$ | 20 | 22 |
| 37 | $Ba_2Zn_2Fe_{12}O_{22}$ | Y | 71 | 78 | $BaTiO_3$ | 20 | 22 |
| 38 | $Ba_2Zn_2Fe_{12}O_{22}$ | Y | 72 | 78 | $BaTiO_3$ | 21 | 22 |
| 39 | $Ba_2Zn_2Fe_{12}O_{22}$ | Y | 71 | 78 | $BaTiO_3$ | 20 | 22 |
| 40 | $Ba_2Zn_2Fe_{12}O_{22}$ | Y | 70 | 78 | $BaTiO_3$ | 20 | 22 |
| 41 | $Ba_2CoZnFe_{12}O_{22}$ | Y | 70 | 78 | $BaTiO_3$ | 20 | 22 |
| 42 | $Ba_2Co_2Fe_{12}O_{22}$ | Y | 70 | 78 | $BaTiO_3$ | 20 | 22 |
| 43 | $Ba_2CoCuFe_{12}O_{22}$ | Y | 70 | 78 | $BaTiO_3$ | 20 | 22 |
| 44 | $Ba_2Cu_2Fe_{12}O_{22}$ | Y | 70 | 78 | $BaTiO_3$ | 20 | 22 |
| 45 | $Ba_2CuZnFe_{12}O_{22}$ | Y | 70 | 78 | $BaTiO_3$ | 20 | 22 |
| 46 | $BaFe_{12}O_{19}$ | M | 70 | 78 | $SrTiO_3$ | 20 | 22 |
| 47 | $Ba_3ZnCuFe_{24}O_{41}$ | Z | 70 | 78 | $SrTiO_3$ | 20 | 22 |
| 48 | $BaCo_2Fe_{16}O_{27}$ | W | 70 | 78 | $SrTiO_3$ | 20 | 22 |
| *49 | $Ni_{0.15}Zn_{0.25}Cu_{0.12}Fe_{0.36}O_{1.36}$ | spinel | 70 | 78 | $BaTiO_3$ | 20 | 22 |

| sample No. | 1) Amount (mass %) | Glass Composition (mass %) | | | | | | | 2) Amount of Li in terms of $Li_2O$ (mass %) | 2) Amount of Bi in terms of $Bi_2O_3$ (mass %) | Firing Temperature (° C.) |
|---|---|---|---|---|---|---|---|---|---|---|---|
| | | $SiO_2$ | CaO | BaO | $Li_2O$ | $Al_2O_3$ | $B_2O_3$ | MgO | | | |
| 1 | 6.8 | 24 | 13 | 60 | 3 | 0 | 0 | 0 | 0.0 | 0.0 | 950 |
| 2 | 6.5 | 28 | 13 | 55 | 4 | 0 | 0 | 0 | 0.0 | 0.0 | 950 |
| 3 | 5.6 | 40 | 15 | 41 | 4 | 0 | 0 | 0 | 0.0 | 0.0 | 1000 |
| 4 | 5.5 | 40 | 15 | 41 | 4 | 0 | 0 | 0 | 0.0 | 0.0 | 1000 |
| 5 | 5.7 | 40 | 15 | 41 | 4 | 0 | 0 | 0 | 0.0 | 0.0 | 950 |
| 6 | 5.7 | 40 | 15 | 41 | 4 | 0 | 0 | 0 | 0.0 | 0.0 | 950 |
| 7 | 5.8 | 40 | 15 | 41 | 4 | 0 | 0 | 0 | 0.0 | 0.0 | 950 |
| 8 | 2.9 | 40 | 15 | 41 | 4 | 0 | 0 | 0 | 0.0 | 0.0 | 950 |
| 9 | 1.5 | 40 | 15 | 41 | 4 | 0 | 0 | 0 | 0.0 | 0.0 | 950 |
| 10 | 4.4 | 40 | 15 | 41 | 4 | 0 | 0 | 0 | 0.0 | 0.0 | 950 |
| 11 | 23.1 | 40 | 15 | 41 | 4 | 0 | 0 | 0 | 0.0 | 0.0 | 900 |
| 12 | 17.3 | 40 | 15 | 41 | 4 | 0 | 0 | 0 | 0.0 | 0.0 | 950 |
| 13 | 11.5 | 40 | 15 | 41 | 4 | 0 | 0 | 0 | 0.0 | 0.0 | 950 |
| 14 | 1.5 | 40 | 15 | 41 | 4 | 0 | 0 | 0 | 0.0 | 0.0 | 950 |
| 15 | 5.0 | 55 | 17 | 23 | 5 | 0 | 0 | 0 | 0.0 | 0.0 | 1000 |
| 16 | 4.6 | 64 | 18 | 13 | 5 | 0 | 0 | 0 | 0.0 | 0.0 | 1000 |
| 17 | 6.5 | 35 | 7 | 54 | 4 | 0 | 0 | 0 | 0.0 | 0.0 | 1000 |
| 18 | 5.0 | 45 | 26 | 24 | 5 | 0 | 0 | 0 | 0.0 | 0.0 | 1000 |
| 19 | 6.3 | 37 | 14 | 47 | 2 | 0 | 0 | 0 | 0.0 | 0.0 | 1000 |
| 20 | 5.1 | 44 | 16 | 33 | 7 | 0 | 0 | 0 | 0.0 | 0.0 | 950 |
| 21 | 4.5 | 53 | 13 | 24 | 10 | 0 | 0 | 0 | 0.0 | 0.0 | 900 |
| 22 | 4.8 | 53 | 13 | 24 | 10 | 0 | 0 | 0 | 0.0 | 0.0 | 900 |
| 23 | 5.9 | 34 | 15 | 40 | 4 | 7 | 0 | 0 | 0.0 | 0.0 | 1000 |
| 24 | 6.1 | 30 | 14 | 39 | 4 | 13 | 0 | 0 | 0.0 | 0.0 | 1000 |
| 25 | 5.6 | 35 | 15 | 41 | 4 | 0 | 5 | 0 | 0.0 | 0.0 | 900 |
| 26 | 5.8 | 32 | 15 | 40 | 4 | 0 | 8 | 0 | 0.0 | 0.0 | 900 |
| 27 | 5.2 | 40 | 15 | 41 | 4 | 0 | 0 | 0 | 0.0 | 0.0 | 950 |
| 28 | 5.9 | 40 | 15 | 41 | 4 | 0 | 0 | 0 | 0.0 | 0.0 | 950 |
| 29 | 5.9 | 40 | 15 | 41 | 4 | 0 | 0 | 0 | 0.0 | 0.0 | 1000 |
| 30 | 6.0 | 40 | 15 | 41 | 4 | 0 | 0 | 0 | 0.0 | 0.0 | 1000 |
| *31 | 5.3 | 41 | 3 | 16 | 0 | 12 | 13 | 15 | 0.0 | 0.0 | 1000 |
| 32 | 5.2 | 41 | 3 | 16 | 0 | 12 | 13 | 15 | 0.2 | 0.0 | 1000 |
| 33 | 5.0 | 41 | 3 | 16 | 0 | 12 | 13 | 15 | 1.0 | 0.0 | 950 |
| 34 | 5.7 | 41 | 3 | 16 | 0 | 12 | 13 | 15 | 0.2 | 0.0 | 1000 |
| 35 | 5.2 | 41 | 3 | 16 | 0 | 12 | 13 | 15 | 1.0 | 0.0 | 950 |
| 36 | 5.7 | 40 | 15 | 41 | 4 | 0 | 0 | 0 | 0.0 | 0.4 | 950 |
| 37 | 5.0 | 40 | 15 | 41 | 4 | 0 | 0 | 0 | 0.0 | 3.8 | 900 |
| 38 | 4.4 | 40 | 15 | 41 | 4 | 0 | 0 | 0 | 0.0 | 7.6 | 900 |
| 39 | 4.8 | 41 | 3 | 16 | 0 | 12 | 13 | 15 | 1.0 | 3.8 | 950 |
| 40 | 5.5 | 40 | 15 | 41 | 4 | 0 | 0 | 0 | 1.0 | 0.4 | 900 |
| 41 | 5.7 | 40 | 15 | 41 | 4 | 0 | 0 | 0 | 0.0 | 0.0 | 1000 |
| 42 | 5.7 | 40 | 15 | 41 | 4 | 0 | 0 | 0 | 0.0 | 0.0 | 1000 |
| 43 | 5.7 | 40 | 15 | 41 | 4 | 0 | 0 | 0 | 0.0 | 0.0 | 950 |
| 44 | 5.7 | 40 | 15 | 41 | 4 | 0 | 0 | 0 | 0.0 | 0.0 | 950 |
| 45 | 5.7 | 40 | 15 | 41 | 4 | 0 | 0 | 0 | 0.0 | 0.0 | 950 |
| 46 | 5.9 | 40 | 15 | 41 | 4 | 0 | 0 | 0 | 0.0 | 5.0 | 1000 |

TABLE 1-continued

| | | | | | | | | | | | |
|---|---|---|---|---|---|---|---|---|---|---|---|
| 47 | 5.9 | 40 | 15 | 41 | 4 | 0 | 0 | 0 | 0.0 | 5.0 | 1000 |
| 48 | 5.9 | 40 | 15 | 41 | 4 | 0 | 0 | 0 | 0.0 | 5.0 | 1050 |
| *49 | 5.7 | 40 | 15 | 41 | 4 | 0 | 0 | 0 | 0.0 | 0.0 | 950 |

| sample No. | Relative Magnetic Permeability | | | Relative Dielectric Constant | | | Dielectric Loss | Relative Density of Composite Sintered Body (%) |
|---|---|---|---|---|---|---|---|---|
| | Measured Value | Calculated Value by Logarithm Mixing Rule | Ratio of Measured Value to Calculated Value (%) | Measured Value | Calculated Value by Logarithm Mixing Rule | Ratio of Measured Value to Calculated Value (%) | | |
| 1 | 5.2 | 6.0 | 86 | 75 | 55.3 | 136 | >0.1 | 97 |
| 2 | 5.1 | 6.0 | 85 | 75 | 55.3 | 136 | >0.1 | 97 |
| 3 | 3.1 | 3.6 | 86 | 210 | 145.3 | 145 | >0.1 | 98 |
| 4 | 1.5 | 2.8 | 54 | 220 | 235.5 | 93 | >0.1 | 95 |
| 5 | 4.0 | 4.7 | 85 | 130 | 89.7 | 145 | >0.1 | 97 |
| 6 | 5.2 | 6.0 | 86 | 75 | 55.3 | 136 | >0.1 | 98 |
| 7 | 6.5 | 7.8 | 84 | 40 | 34.1 | 117 | >0.1 | 98 |
| 8 | 8.2 | 10.1 | 82 | 30 | 28.6 | 105 | >0.1 | 99 |
| 9 | 7.0 | 11.4 | 61 | 25 | 26.2 | 95 | >0.1 | 90 |
| 10 | 8.0 | 10.1 | 80 | 26 | 24.6 | 106 | >0.1 | 98 |
| 11 | 1.4 | 3.6 | 39 | 25 | 23.1 | 108 | >0.1 | 98 |
| 12 | 4.1 | 4.7 | 88 | 40 | 26.3 | 152 | >0.1 | 97 |
| 13 | 4.5 | 5.3 | 85 | 60 | 38.1 | 157 | >0.1 | 98 |
| 14 | 9.2 | 10.1 | 91 | 35 | 33.4 | 105 | >0.1 | 90 |
| 15 | 5.0 | 6.0 | 83 | 75 | 55.3 | 136 | >0.1 | 93 |
| 16 | 4.9 | 6.0 | 81 | 75 | 55.3 | 136 | >0.1 | 92 |
| 17 | 5.2 | 6.0 | 86 | 75 | 55.3 | 136 | >0.1 | 94 |
| 18 | 5.2 | 6.0 | 86 | 75 | 55.3 | 136 | >0.1 | 94 |
| 19 | 5.3 | 6.0 | 88 | 75 | 55.3 | 136 | >0.1 | 94 |
| 20 | 5.2 | 6.0 | 88 | 75 | 55.3 | 136 | >0.1 | 95 |
| 21 | 5.1 | 6.0 | 85 | 67 | 55.3 | 121 | >0.1 | 95 |
| 22 | 5.3 | 6.0 | 88 | 68 | 55.3 | 123 | >0.1 | 95 |
| 23 | 1.9 | 6.0 | 32 | 56 | 55.3 | 101 | >0.1 | 93 |
| 24 | 1.4 | 6.0 | 23 | 60 | 55.3 | 108 | >0.1 | 94 |
| 25 | 2.3 | 6.0 | 38 | 57 | 55.3 | 103 | >0.1 | 92 |
| 26 | 1.6 | 6.0 | 27 | 56 | 55.3 | 101 | >0.1 | 94 |
| 27 | 2.7 | 6.0 | 45 | 32 | 31.2 | 103 | 0.02 | 95 |
| 28 | 3.9 | 6.8 | 57 | 32 | 30.0 | 107 | 0.03 | 96 |
| 29 | 2.8 | 6.0 | 48 | 35 | 33.8 | 104 | 0.04 | 96 |
| 30 | 3.0 | 4.7 | 64 | 55 | 42.8 | 129 | 0.05 | 98 |
| *31 | 1.2 | 6.0 | 20 | 60 | 55.3 | 108 | >0.1 | 96 |
| 32 | 3.9 | 6.0 | 65 | 75 | 55.4 | 135 | >0.1 | 97 |
| 33 | 9.3 | 6.1 | 153 | 95 | 55.9 | 170 | >0.1 | 98 |
| 34 | 3.8 | 6.0 | 63 | 35 | 31.2 | 112 | 0.02 | 97 |
| 35 | 9.1 | 6.1 | 150 | 40 | 34.1 | 117 | 0.05 | 98 |
| 36 | 5.0 | 6.0 | 83 | 67 | 55.4 | 121 | >0.1 | 97 |
| 37 | 5.0 | 6.2 | 81 | 50 | 57.0 | 88 | >0.1 | 96 |
| 38 | 5.0 | 6.3 | 79 | 37 | 58.5 | 63 | >0.1 | 96 |
| 39 | 9.1 | 6.1 | 148 | 43 | 56.5 | 76 | >0.1 | 98 |
| 40 | 9.0 | 6.1 | 148 | 40 | 55.9 | 72 | >0.1 | 98 |
| 41 | 3.0 | 3.1 | 97 | 55 | 55.3 | 99 | >0.1 | 98 |
| 42 | 2.0 | 2.2 | 93 | 54 | 55.3 | 98 | >0.1 | 97 |
| 43 | 1.8 | 1.9 | 95 | 51 | 55.3 | 92 | >0.1 | 98 |
| 44 | 1.6 | 1.8 | 89 | 52 | 55.3 | 94 | >0.1 | 98 |
| 45 | 3.0 | 3.1 | 97 | 54 | 55.3 | 98 | >0.1 | 98 |
| 46 | 1.4 | 1.6 | 88 | 41 | 27.6 | 148 | >0.1 | 97 |
| 47 | 2.4 | 3.1 | 78 | 40 | 33.8 | 118 | >0.1 | 96 |
| 48 | 2.4 | 2.6 | 91 | 33 | 34.8 | 95 | >0.1 | 96 |
| *49 | 1.2 | 1.1 | 106 | 19 | 18.4 | 103 | >0.1 | 95 |

*The asterisk refers to samples which are outside the scope of the present invention.

Samples No 1~30 and 32~48 containing Li in the composite sintered body which are within the scope of the present invention, shows a small decrease in the relative magnetic permeability and the relative dielectric constant. Especially, samples No. 32~35 using $Li_2CO_3$ as a raw material also shows a small decrease in the relative magnetic permeability and the relative dielectric constant, of which the relative permeability was 1.4 or more.

Further, with respect to the samples, the crystal phase was identified by X-ray diffraction. In samples No. 1~30 and 32~48, it was observed that the crystal of magnetic substance and the crystal of dielectric substance which were used as raw materials remained same. On the contrary, a $BaAl_2Si_2O_8$ crystal was observed in samples No. 23 and 24 where $Al_2O_3$ is contained in glass. Also, a deposition of heterogeneous phase was observed in samples No. 25, 26, 31~35 and 39.

Samples No. 27~30, 34 and 35 where $CaTiO_3$ and $SrTiO_3$ were used as the dielectric material, showed a very small decrease in the dielectric loss, compared to samples where $BaTiO_3$ was used as the dielectric material.

Sample No. 31 showed a remarkable reduction of the relative magnetic permeability, resulting from the reaction between the hexagonal Y type Ba ferrite and the dielectric substance due to the absence of Li. Sample No. 49 showed less than 1.4 of relative magnetic permeability at 1 GHz, resulting from using a spinel type ferrite.

Next, the raw materials shown in Table 1 were mixed in butanol solvent, 10 mass % of binder such as polyvinylbutyral was added with respect to the mixed powders and kneaded to produce a slurry. The slurry was formed into a green sheet having the thickness of 50 μm by doctor blade method.

And then, 20 sheets of the green sheet were laminated each and on the way of the lamination process, a coil and a condenser were formed by printing as an inner electrode (inner conductor), by using Ag—Pd (7:3) paste which is available at a market (the coil is connected through a through hole), followed by hot pressing, sintering, and cutting the sintered body into the size of 2.0×1.25 mm, thereby producing each of LC composite EMI filter chip component having a structure of three terminal.

Subsequently, the chip component was subjected to degreasing process at 400° C., and fired for 2 hours at 1000° C. in atmosphere. The obtained chip component which is a LC composite electronic component of the present embodiment shows a better property with dense microstructure for wiring layers and insulating layers.

Further, the frequency property of the obtained LC composite EMI filter chip component which is a LC composite electronic component of the present embodiment was measured by a network analyzer. As a result, the obtained chip component enabled an attenuation pole of low frequency, with the equivalent number of coil turn to the one using conventional dielectric substance, and enabled to obtain the attenuation property at a lower frequency with the equivalent size to the low pass filter using conventional dielectric substance.

What is claimed is:

1. A composite sintered body of dielectric substance and magnetic substance comprising:
    a hexagonal Ba ferrite crystal;
    a perovskite type crystal containing at least one element selected from Ca, Sr, and Ba, and Ti; and
    Li element;
    wherein the relative magnetic permeability is 1.4 or more at 1 GHz.

2. The composite sintered body according to claim 1, wherein the main composition of the composite sintered body is 55~95 vol % of the hexagonal Ba ferrite crystal, and 5~45 vol % of the perovskite type crystal.

3. The composite sintered body according to claim 1, further comprising glass, wherein glass contains Si, Ca, Ba and Li, and is substantially free from Al and B.

4. The composite sintered body according to claim 3, wherein the hexagonal Ba ferrite crystal is mainly a Y type hexagonal Ba ferrite crystal.

5. The composite sintered body according to claim 4, wherein the perovskite type crystal is $BaTiO_3$.

6. The composite sintered body according to claim 4, wherein the perovskite type crystal is $CaTiO_3$ or $SrTiO_3$.

7. The composite sintered body according to claim 4, wherein the composite sintered body is substantially free from $BaAl_2Si_2O_8$ crystal, $BaB_2O_4$ crystal, $ZnAl_2O_4$ crystal and $CaAl_2Si_2O_8$ crystal.

8. A LC composite electronic component comprising:
    the composite sintered body according to claim 1;
    a condenser circuit formed in the inside or the surface of the composite sintered body; and
    an inductor circuit formed in the inside or the surface of the composite sintered body.

* * * * *